3,183,565
CABLE SHORTENER

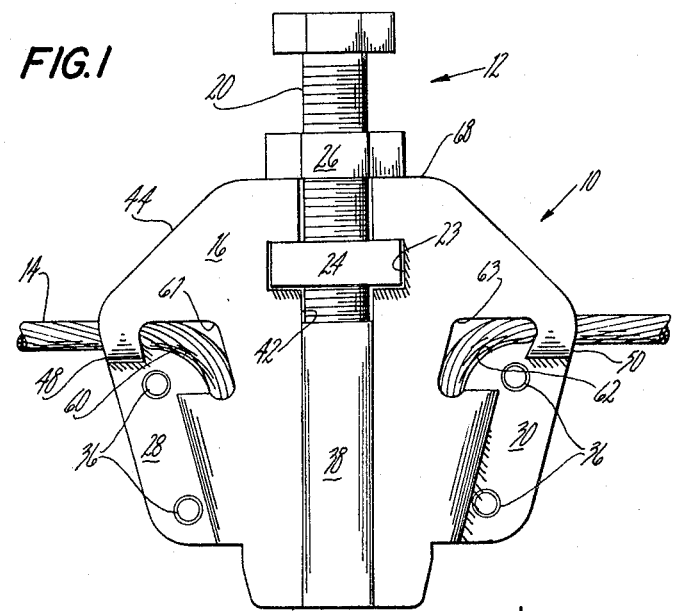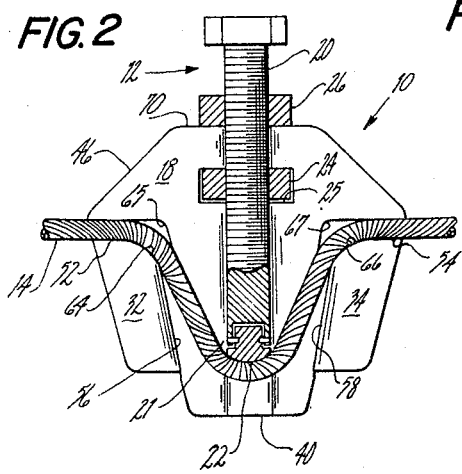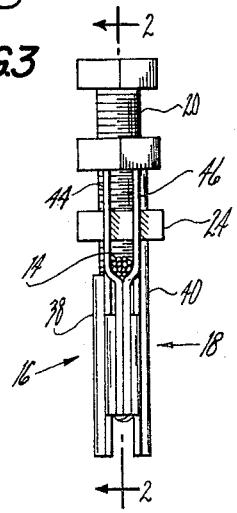

Ernest I. Schwarz, Middletown, Conn., assignor to The Eis Automotive Corporation, Middletown, Conn., a corporation of Connecticut
Filed Nov. 14, 1963, Ser. No. 323,682
2 Claims. (Cl. 24—71.1)

The present invention relates to devices for tightening or shortening the effective length of cables, and, more particularly, to cable a shortener which shortens the cable by deforming a short segment thereof.

A general object of the present invention is to provide a cable shortener which is compact in size and light in weight so as to be well suited to low cost quantity production.

Another object of the present invention is to provide an adjustable cable shortener which permits various degrees of shortening or tensioning.

The drawing shows a preferred embodiment of the invention and such embodiment will be described, but it will be understood that various changes may be made from the construction disclosed and that the drawing and description are not to be construed as defining or limiting the scope of the invention, the claims forming a part of this specification being relied upon for that purpose.

Of the drawing:

FIG. 1 is a front view of a cable and a cable shortener of the present invention;

FIG. 2 is a sectional view taken along the line 2—2 of FIG. 3; and

FIG. 3 is a side view of the FIG. 1 cable shortener.

Referring now to the drawings in greater detail, a preferred form for a cable shortener of the present invention is shown in FIG. 1 as including a housing member 10 and screw means 12. A cable 14 clamped securely between the housing member 10 and screw means 12, will have its effective length shortened thereby. The cable 14 may be attached to fixed structures at either end thereof, as is the hand brake cable on most present-day automobiles for example, in which case the cable shortener can be used to tighten such a cable. The adjustable cable shortener described herein will be of particular advantage in such an application because the conventional adjustment means provided by the automobile manufacturer will often provide insufficient travel to compensate for normal stretching of the standard type of cable commonly used; and too, on older model automobiles such an adjustment means will often have become so rusted and corroded as to be unsuitable for its intended purpose.

Turning now to the construction of the housing member 10, FIG. 1 shows this member as comprising a front wall or plate 16 having rearwardly bent lower portions 28 and 30 adjacent the side edges thereof. From FIG. 2 this housing member will be seen to comprise a rear wall or plate 18 having forwardly bent lower portions 32 and 34 adjacent the side edges thereof. FIG. 3 shows these front and rear walls 16 and 18 respectively in spaced apart relationship with their corresponding lower side edge portions engaged as by spot welding or the like indicated generally at 36, 36.

As shown in FIG. 1, the front wall or plate 16 has a vertically arranged fluted portion 38 which is stamped or otherwise formed in the center of this plate to accommodate a screw 20 to be described. Similarly, the rear wall or plate 18 has a corresponding fluted portion 40 to provide a generally cylindrical opening in the housing for this screw 20. An upper portion 44 of the front plate 16 defines a vertically extending notch 42 above said front fluted portion 38 and forwardly of said fluted rear wall portion 40. Also defined in the upper portion 44 of the front wall 16 is a generally horizontal slot 23 which is preferably located across said vertically disposed notch 42 for a purpose to be discussed hereinbelow. The rear wall 18 defines another slot 25 in an upper portion 46 thereof which slot is aligned with the slot 23. These slots, 23 and 25, combine to provide a convenient receptacle for a nut 24 to be described hereinbelow in connection with the screw means 12.

The lower side edge portions defined by the corresponding lower portions of the front and rear walls 16 and 18 respectively are engaged and in the construction shown are adapted to receive a segment of the cable thereabove as best shown in FIGS. 2 and 3. It will be apparent that this segment of the cable when received in the housing will extend generally horizontally across and between the walls and over said side edge portions. As shown in FIG. 1, the lower left side edge portion 28 of the front plate 16 has a top bend 48 which cooperates with a top bend 52 (FIG. 2) on the corresponding lower left side edge portion 32 of the rear plate 18 to support the cable at the left-hand side of the housing 10. The right-hand side is generally similar, the lower right side edge portion 30 of the front plate 16 having a top bend 50 which cooperates with a top bend 54 on the corresponding lower right side edge portion to support the cable at the right-hand side of the housing. These top bends define, at least in part, spaced lands on the housing for contacting spaced points on the cable to be shortened. It will be apparent that the initial position of the cable segment in the housing will be a horizontal one and it will be shown that this cable segment can be displaced downwardly in the housing so that the cable segment is adjustably increased by operation of the screw means 12.

Initially at least, the cable will slide relative to the above described horizontally aligned lands. However, as the cable segment is deformed to the position shown in FIG. 2, these lands are preferably so shaped as to avoid sharp bends in the cable. It is a feature of the present invention that these lands, which are defined by the tops of these lower side edge portions, be provided with rounded inner corners as shown to increase the bend radius of the cable segment in these areas. In the preferred construction shown, this feature is very efficiently embodied in this housing by providing openings in the front and rear plates immediately inwardly of the tops of these lower side edge portions. The left side of front plate 16 has a generally triangular opening 61 which is aligned with a similarly shaped opening 65 in the rear plate 18. The lower edges of each of these openings, 60 and 64 respectively, lie adjacent to one another and are arcuate in shape to define a continuation of the left-hand land described hereinabove. Correspondingly, the right side of front plate 16 has a generally triangular opening 63 which is aligned with a similarly shaped opening 67 in the rear plate 18. These openings, like their oppositely arranged counterparts on the left side of the housing, have lower arcuate edges 62 and 66 respectively which define a continuation of the right-hand land described hereinabove.

Prior to a discussion of the screw means 12, it should be noted that these triangular openings permit the lower side edge portions to be more easily formed in that the bends required are kept relatively straight as shown in FIGS. 1 and 2. Thus the construction shown results in a cable shortener readily suited to being produced on a low cost quantity production basis.

The screw means 12 will be seen to comprise a conventional machine screw 20 adapted to be vertically arranged in the housing member 10, and a first nut 24 adapted to be horizontally positioned in the aligned slots 23 and 25. Also provided is a jam nut 26 which serves as a lock nut precluding any tendency of the screw to become loosened in said first nut 24 due to vibration or the like. As so arranged, the screw 20 can be threadably advanced relative to the first nut 24 which is preferably square and hence well adapted to be nonrotatably received in the slots 23 and 25. The lower end of the screw 20 will thus engage and displace the cable segment downwardly inside the housing as shown in FIG. 2.

In accordance with the present invention, a cable engaging element 22 is provided at the lower end of said screw 20 and is rotatably supported thereat to bear against an intermediate portion of the cable segment as the screw is so advanced. This element 22 is preferably made of brass or other relatively soft material to avoid damaging the cable and as shown has a generally hemispherical lowermost end which also aids in avoiding damage to the cable. It will be apparent that as this element bears against the cable under the force of the advancing screw, it will permit the latter to rotate but will not rotate itself, further assuring that he cable is not damaged.

The cable engaging element 22 may be held in place at the lowermost end of the screw 20 by any convenient means, but as shown, a series of radially extending retaining legs 21, 21 are pressed into slots provided therefor in the screw 20. A generally cylindrical bore in the lower end of the screw is adapted to receive the cylindrical upper end portion of the cable engaging element 22 and an annular groove in said cylindrical portion is adapted to receive the inner ends of said retaining legs 21, 21 so that the element is rotatably held at the lower end of the screw.

As shown, this cable engaging element is of the same diameter as that of the threaded portion of the screw 20. Further, upon assembly, the aforementioned nuts 24 and 26 must be threaded on the screw 20 before this element 22 is secured by the legs 21, 21. Once assembled, however, these parts will be seen to comprise a very efficient screw means 12 for use with the above described housing 10 in shortening the effective length of the cable 14. From inspection of FIG. 2, it will be obvious that the element 22 cannot be readily removed from the screw 20 after assembly. The outer ends of the radial legs 21, 21, as well as the periphery of the lower end of the element 22 preclude disassembly of the nuts 24 and 26. Thus the element 22 not only functions as a nonrotating bearing surface for the cable, but said element also functions as a stop at the lower end of the screw 20 to preclude disassembly of the screw and its nuts.

Turning now to the operation of the above described cable shortener, it will be recalled that the device is particularly well adapted to decreasing the effective length of a cable that has its ends secured. In such an application, the screw means 12 would first be separated from the housing 10 and the latter placed over the cable so that the cable extends in a straight line across and between the front and rear walls 16 and 18 respectively. While the housing is held against the cable so that the above described lands are in contact with the cable segment in the housing, the screw 20 is passed rearwardly through the notch 42 in the front plate 16. Since the screw and nut are not separable, the latter must be positioned at the lower end of the screw so as to be received in the slot 23. Both the slot 23 and the notch 42 are so located with respect to the initially straight cable segment in the housing that the hemispherical lower end of the cable engaging element 22 will not interfere with said initially straight cable 14.

The screw 20 is then advanced relative to the nut 24, and to the housing in which the nut is supported, so that the nonrotating element 22 bears against an intermediate portion of the cable forcing an ever increasing segment thereof downwardly into the housing. As mentioned, the housing is so constructed that the cable is adapted to slide relative to the housing so that the effective length thereof outside the housing is decreased.

At the approximate limit of travel of the screw 20, the cable preferably contacts downwardly convering inner side walls 56 and 58 of the housing 10 and the intermediate portion of the cable will protrude slightly below the lowermost edges of the front and rear plates 16 and 18 respectively. As so arranged, the user is warned not to attempt excessive shortening of the cable both visually by the appearance of the stressed cable below the housing, and also by the resistance encountered when the cable contacts these side walls.

When the proper degree of shortening or tensioning has been achieved, the second jam nut 26 is advanced relative to the screw 20 until it engages upper edges 68 and 70 of the front and rear plates, 16 and 18 respectively. As so arranged, the cable shortener is securely clamped to the cable and will not become loosened due to vibration or the like.

The invention claimed is:

1. A device for shortening the effective length of a cable that may have its ends secured, said device comprising a housing having a front wall and a generally similar rear wall spaced rearwardly therefrom, said housing being adapted to receive a segment of the cable between said front and rear walls, lower portions of these walls adjacent the side edges thereof being engaged and being elongated vertically and defining arcuate corners at the top thereof so that the segment of the cable received in the housing initially extends generally horizontally across and between the walls and over the arcuate corners at the engaged side edge portions thereof, screw means detachably mounted on said housing for generally vertical movement downwardly between said walls, and a cable engaging element rotatably retained at the lower end of said screw means for downward movement between said walls in response to rotation of said screw means and adapted to bear against one side only of the cable and to displace the segment thereof downwardly inside the housing and between the engaged side edge portions and between said front and rear walls.

2. A device for shortening the effective length of a cable as set forth in claim 1 wherein said screw means comprises a generally vertically arranged screw and a first nut threadably received thereon, and wherein said front and rear walls define aligned slots for nonrotatably receiving said first nut, said front wall also defining a vertically arranged notch wide enough horizontally to admit said screw into the space between said front and rear walls, and long enough vertically to permit said screw and nut to be so admitted in assembled relationship, said cable engaging element being of approximately the same diameter as said screw whereby said element is adapted to retain said first nut in said assembled relation.

References Cited by the Examiner
UNITED STATES PATENTS

| | | | |
|---|---|---|---|
| 2,336,818 | 12/43 | Topinka | 24—71.1 |
| 2,444,743 | 7/48 | Melidoni | 24—71.1 |
| 2,741,818 | 4/56 | Bader | 24—71.1 |

FOREIGN PATENTS

| | | |
|---|---|---|
| 902,891 | 1/45 | France. |

DONLEY J. STOCKING, *Primary Examiner.*